US008271500B2

(12) United States Patent
Chellapilla et al.

(10) Patent No.: US 8,271,500 B2
(45) Date of Patent: Sep. 18, 2012

(54) MINIMAL PERFECT HASH FUNCTIONS USING DOUBLE HASHING

(75) Inventors: Kumar Hemachandra Chellapilla, Redmond, WA (US); Anton Mityagin, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 855 days.

(21) Appl. No.: 11/853,635

(22) Filed: Sep. 11, 2007

(65) Prior Publication Data

US 2009/0070354 A1    Mar. 12, 2009

(51) Int. Cl.
  G06F 7/00      (2006.01)
  G06F 17/30     (2006.01)
  G06F 9/26      (2006.01)
  G06F 9/34      (2006.01)

(52) U.S. Cl. .................................. 707/747; 711/216

(58) Field of Classification Search .............. 707/741, 707/747; 711/216
See application file for complete search history.

(56) References Cited

U.S. PATENT DOCUMENTS

| | | | |
|---|---|---|---|
| 5,319,779 A | 6/1994 | Chang et al. | |
| 5,692,177 A | 11/1997 | Miller | |
| 6,058,392 A * | 5/2000 | Sampson et al. ..................... | 1/1 |
| 6,212,525 B1 * | 4/2001 | Guha .......................... | 707/747 |
| 6,226,629 B1 | 5/2001 | Cossock | |
| 6,434,662 B1 * | 8/2002 | Greene et al. .................. | 711/108 |
| 6,865,577 B1 * | 3/2005 | Sereda ................................ | 1/1 |
| 6,925,085 B1 | 8/2005 | Krishna et al. | |
| 7,370,048 B2 * | 5/2008 | Loeb ................................... | 1/1 |
| 2003/0033531 A1 | 2/2003 | Hanner | |
| 2004/0255045 A1 * | 12/2004 | Lim et al. ....................... | 709/245 |
| 2005/0102531 A1 * | 5/2005 | Yang ............................... | 713/200 |
| 2005/0171937 A1 | 8/2005 | Hughes | |
| 2006/0136390 A1 * | 6/2006 | Zhao et al. ......................... | 707/3 |
| 2006/0218176 A1 * | 9/2006 | Sun Hsu et al. ................ | 707/102 |
| 2006/0248079 A1 | 11/2006 | Braica | |
| 2006/0271539 A1 * | 11/2006 | Loeb .................................. | 707/7 |
| 2007/0083531 A1 | 4/2007 | Hussain | |
| 2008/0065639 A1 * | 3/2008 | Choudhary et al. .............. | 707/7 |

OTHER PUBLICATIONS

Edward Fox et al., Order-Preserving Minimal Perfect Hash Functions and Information Retrieval, ACM Transactions on Information Systems, vol. 9, issue 3, Jul. 1991, pp. 281-308.*
Thomas J. Sager, A Polynomial Time Generator for Minimal Perfect Hash Functions, Communications of ACM, vol. 28. No. 5, May 1985.*
Bohdan Majewski et al., A Family of Perfect Hashing Methods, The Computer Journal, vol. 39, No. 6, published 1996.*
Kumar Chellapilla et al. GigaHash: Scalable Minimal Perfect Hashing for Billions of URLS, ACM, published May 12, 2007.*
Fox et al., A More Cost Effective Algorithm for Finding Minimal Perfect Hash Functions, ACM, published 1989.*

(Continued)

Primary Examiner — Jeffrey A Burke
(74) Attorney, Agent, or Firm — Hope Baldauff Hartman, LLC

(57) ABSTRACT

Technologies are described herein for constructing a minimal perfect hash function. According to embodiments, a hash table is constructed by double hashing each of the strings in a set of strings. A computed double hash value is utilized to identify an empty location in the hash table for each string. A signature for each string is stored in the empty location of the hash table identified for the string. In order to obtain a minimal perfect hash value for an input string, the input string is iteratively double hashed until a location is identified in the hash table that contains a signature corresponding to the input string. The minimal perfect hash value is an integer value identifying the location in the hash table that contains the signature corresponding to the input string.

15 Claims, 8 Drawing Sheets

OTHER PUBLICATIONS

Fox, et al., "Practical Minimal Perfect Hash Functions for Large Databases" Aug. 8, 1990, pp. 33.

Kong, "GGPERF: A Perfect Hash Function Generator", Jun. 30, 1997, pp. 17.

Nyerges, et al., "Hash Table Improvement—Double Hashing", Dec. 15, 2003, pp. 1-10.

Botelho, et al., "An Approach for Minimal Perfect Hash Functions for Very Large Databases", Technical Report, 2004, pp. 8.

Botelho, et al., "A Practical Minimal Perfect Hashing Method", 4th International Workshop on efficient and Experimental Algorithms (WEA05), vol. 3505, May 2005, Springer-Verlag Berlin Heidelberg, 2005, pp. 488-500.

Czech, et al., "An Optimal Algorithm for Generating Minimal Perfect Hash Functions", Information Processing Letters, vol. 45, No. 5, Oct. 1992, pp. 1-12.

Chellapilla, et al., "GigaHash: Scalable Minimal Perfect Hashing for Billions of URLs", In Proceedings of the 16th International Conference on World Wide Web, WWW'07, May 8-12, 2007, ACM Press, pp. 2.

\* cited by examiner

MINIMAL PERFECT HASH FUNCTIONS USING DOUBLE HASHING

BACKGROUND

World Wide Web ("Web") search engines typically operate on very large data sets. For instance, it is not uncommon for a Web search engine to maintain more than 20 billion uniform resource locators ("URLs") in its database. Each URL corresponds to a unique Web page. The URLs are variable-sized, ranging from approximately 5 to 1000 characters or more, and on average, are approximately 80 characters in length. As a result, the mass storage capacity needed to simply store 20 billion 80-character average length URLs is in excess of 1.6 terabytes. Due to its extremely large size, it is also very computationally expensive to perform processing operations on such a large set of URLs.

In order to more efficiently perform processing functions on a large set of URLs, such as performing page rank computations, Web search engines commonly distribute the URLs over a group of server computers. The URLs assigned to each server computer are then mapped to contiguous integers locally on each of the computers. The integers are called rank identifiers ("rank IDs"). The rank IDs are utilized instead of the URLs to uniquely reference the corresponding Web pages because computers tend to be more efficient at processing integers than strings. In this way, identifiers for each of the Web pages can be stored and operated on in a manner that utilizes significantly less space than storage of the actual URLs and improves performance.

The process of distributing the URLs over the group of server computers and mapping the URLs to rank IDs on each server computer is, however, very computationally expensive. In fact, the process of mapping the URLs to rank IDs can take up to 25-30% of the total computation time of the page rank computation using previous solutions. Moreover, in order to exchange information regarding the URLs between the server computers, a rank ID local to one server computer must first be converted back to the corresponding URL, and then converted to a rank ID local to another server computer. Corresponding local rank IDs may be pre-computed, but this also is a computationally expensive process.

It is with respect to these considerations and others that the disclosure made herein is presented.

SUMMARY

Technologies are described herein for generating a minimal perfect hash function using double hashing. In particular, through the utilization of the technologies and concepts presented herein, a minimal perfect hash function is generated that maps URLs to unique rank IDs in less time and using less space than in previous solutions. Moreover, through this process global rank IDs can also be created, thereby eliminating the need to convert local rank IDs or to pre-compute corresponding local rank IDs.

According to one aspect presented herein, a minimal perfect hash function is provided that utilizes double hashing to improve efficiency and reduce storage requirements. A perfect hash function is a function that maps a static set of keys, such as a set of URLs, into a set of integer numbers without collisions. A minimal perfect hash function (referred to herein as a "MPHF") is a perfect hash function wherein the number of keys is equal to the number of integers and the range of integers is contiguous between zero and the number of integers minus one. While regular hash functions are stateless and deterministic, MPHFs require intermediate storage proportional to the number of elements in the set. As a result, when a MPHF for a set of elements is initialized, it creates an internal state with intermediate data that depends on the elements in the set.

The embodiments presented herein create the internal state of a MPHF and perform lookup operations through the use of double hashing. In particular, in one embodiment the internal state comprises a hash table having a number of elements, also referred to herein as "elements" or "cells", that is a prime number greater than the number of elements in an input set. The input set comprises a number of strings, such as variable length URLs. In order to populate the table, two universal hash functions ("UHFs") are utilized that map strings to integers between one and the number of elements in the hash table.

In order to map strings to elements in the table, the first UHF, referred to herein as "H1," is utilized to create a hash value for a string. The hash value is then utilized as an index into the hash table. If the indexed element of the hash table is empty, a signature is computed for the string and the signature is stored in the element. In one embodiment, the signature is computed by a third UHF capable of mapping strings to K-bit values. If the indexed element of the hash table is not empty, a new location in the hash table is identified by generating a second hash value for the string using the second UHF, referred to herein as "H2." In one embodiment, the first and second hash values are added together modulo the number of elements in the table to identify the new location in the hash table.

Once the new location in the hash table has been located, a determination is made as to whether the new location is empty. If the new location is empty, the signature for the string is placed in the new location. If the new location is not empty, the double hashing process described above is repeated until an empty location in the hash table is found. This entire process is repeated for each of the input strings in the input set. Once the process has been completed, a determination may be made as to whether the hash table contains intersecting lookup paths for different input strings that have identical signatures. If so, the construction of the hash table may be repeated utilizing three different hash functions until no such collisions are identified in the hash table.

Once the internal state has been constructed, the MPHF provided herein can be evaluated. The MPHF takes an input string and returns an integer value. In order to provide this functionality, the MPHF provided herein first computes a signature for the input string using the same UHF utilized to create signatures during the creation of the hash table. A first hash value is then generated for the input string using H1. A location in the hash table is then identified using the generated hash value. A determination is then made as to whether the location contains the computed signature for the input string. If so, an integer identifying the location in the hash table is returned as the minimal perfect hash value for the input string.

If the identified location does not contain the computed signature for the input string, a second hash value is generated for the input string using H2. A new location is also identified in the hash table by adding the first hash value to the second hash value modulo the number of elements in the hash table. A determination is then made as to whether the new location in the hash table contains the computed signature for the input string. If so, an integer identifying the new location in the hash table is returned as the minimal perfect hash value for the input string. If not, this process is repeated until a location is identified in the hash table that contains the computed signature or all of the elements in the table are examined. If all of the elements have been examined without locating the signature, the input string is not contained in the input set and the input string may be rejected.

According to other embodiments, the items in the input set may be placed into buckets using another UHF. The above-described process for computing a minimal perfect hash value may then be utilized on each of the buckets. The minimal perfect hash values for each bucket are local to that bucket. In order to generate global minimal perfect hash values across all of the buckets, the number of minimal perfect hash values in all of the preceding buckets may be added to a local minimal perfect hash value. In order to facilitate this process, each bucket may store data indicating the number of minimal perfect hash values in all of the preceding buckets.

It should be appreciated that although the embodiments presented herein are described in the context of URLs, the embodiments presented here can also be utilized with any type of input string. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
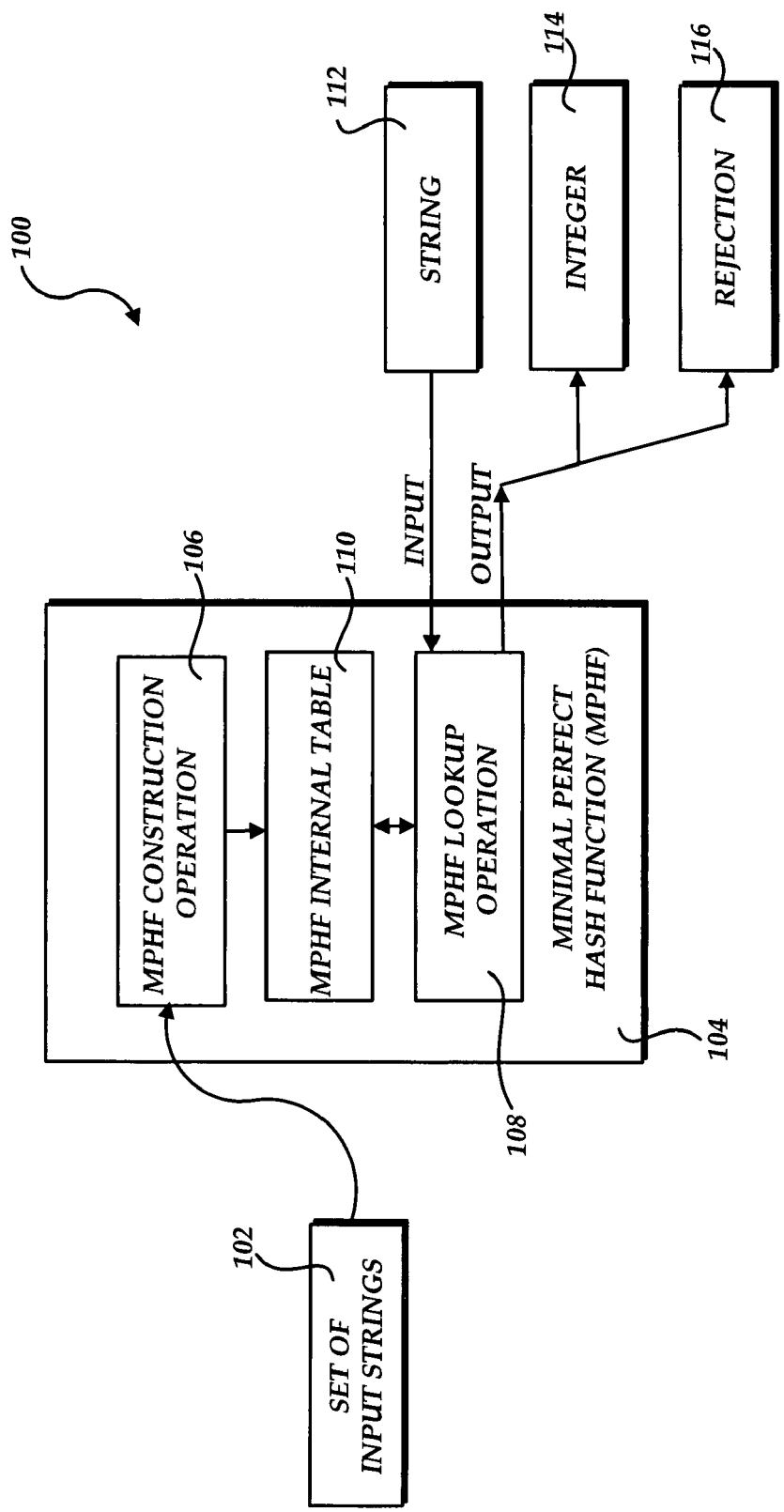
FIG. 1 is a software architecture diagram showing aspects of a minimal perfect hash function provided in one embodiment described herein.

The following detailed description is directed to technologies for generating a minimal perfect hash function using double hashing. Through the utilization of the technologies and concepts presented herein, a minimal perfect hash function is generated that maps strings to unique integers in less time and using less space than in previous solutions. Additional details regarding the various embodiments presented herein for generating a minimal perfect hash function will be provided below with reference to FIGS. 1-8.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for generating a minimal perfect hash function using double hashing will be provided.

Turning now to FIG. 1, a software architecture 100 for providing a minimal perfect hash function in one embodiment will be described. As discussed briefly above, a minimal perfect hash function is a perfect hash function wherein the number of input keys is equal to the number of output integers. In a minimal perfect hash function the range of integers is generally between zero and the number of integers minus one. As also discussed briefly above, minimal perfect hash functions require intermediate storage proportional to the number of elements in an input set. Accordingly, the minimal perfect hash function 104 provided herein includes a construction operation 106 that takes a set of input strings 102 and creates the MPHF internal table 110 (the "table"). The internal table 110 is a hash table utilized by the lookup operation 108 to provide minimal perfect hash values.

As will be discussed in greater detail below, the lookup operation 108 receives a string 112 as input and performs a double hashing operation on the table 110 using the string 112 in order to identify a minimal perfect hash value for the string 112. Accordingly, the output of the lookup operation 108 is an integer value 114 that comprises the minimal perfect hash value for the input string 112. Alternatively, the lookup operation 108 may determine that the string 112 is not within the set of input strings 102. In this case, the lookup operation 108 rejects the input string 112 by providing output in the form of a rejection 116.

As will be discussed in greater detail herein, the construction operation 106 and the lookup operation 108 utilize double hashing. Double hashing refers to a computer programming technique used in hashing to resolve hash collisions. Collisions occur when two different values to be searched for produce an identical hash key. Double hashing utilizes one hash value as a starting point and then repeatedly steps forward in intervals determined using another hash function to another address until the desired value is located. Additional details regarding the particular double hashing techniques provided herein and utilized by the construction operation 106 and the lookup operation 108 will be provided below with respect to FIGS. 2-7.

Figure 2:
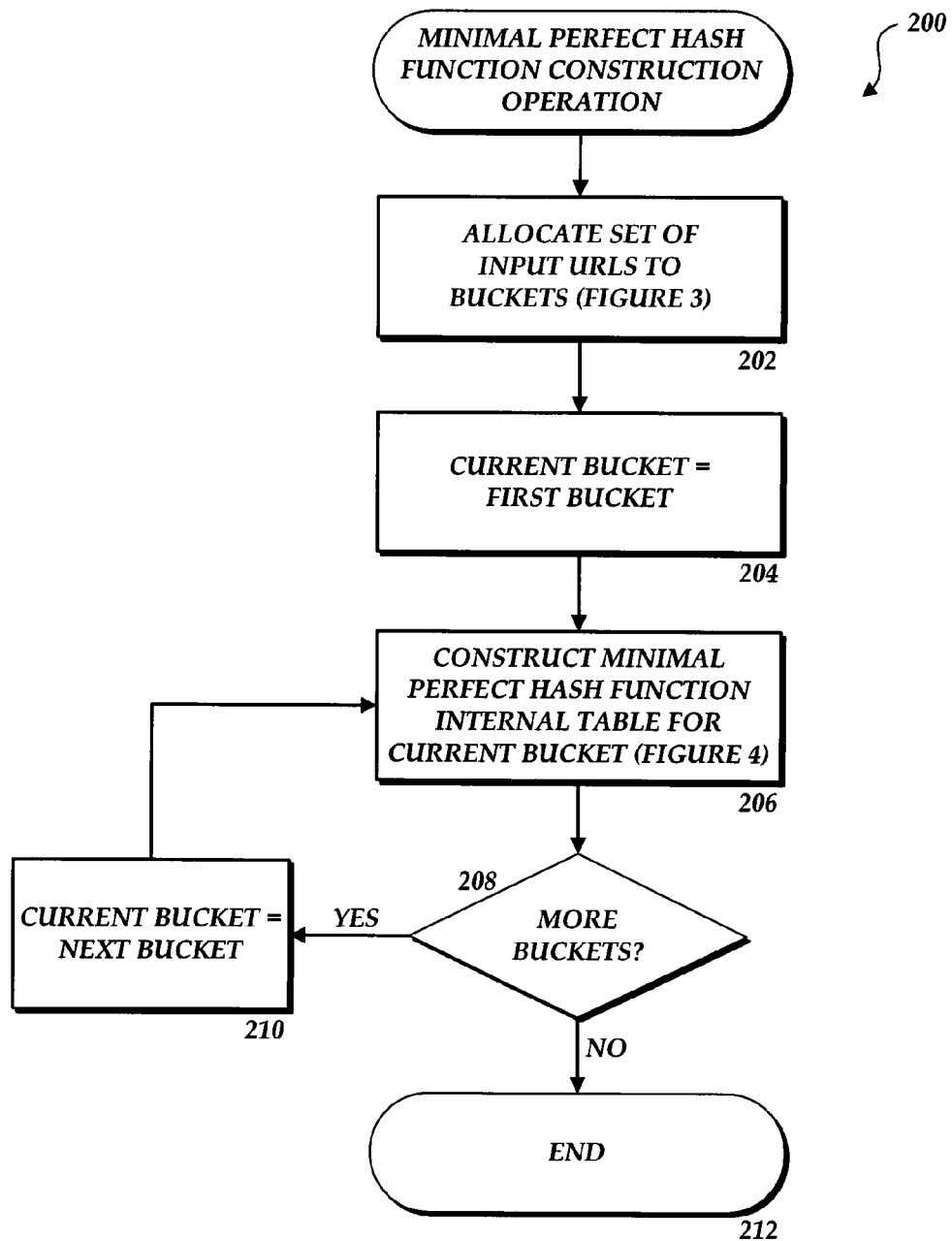
FIG. 2 is a flow diagram showing aspects of an illustrative process for bucketing input strings in one embodiment presented herein.

Referring now to FIG. 2, additional details will be provided regarding the embodiments presented herein for generating a minimal perfect hash function using double hashing. In particular, FIG. 2 shows a flow diagram describing a routine 200 for constructing the internal state utilized by the minimal perfect hash function presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 shown in FIG. 2 will be described below that illustrates the operations performed by the construction operation 106 in one embodiment described herein. As discussed briefly above with respect to FIG. 1, the construction operation 106 constructs the table 110, which comprises the internal state of the minimal perfect hash function 104. The table 110 is utilized by the lookup operation 108 to generate a minimal perfect hash value for an input string 112.

The routine 200 begins at operation 202, where the construction operation 106 allocates the set of input strings 102 to two or more buckets. As known to those skilled in the art, a bucket comprises a data structure utilized to hold items of a particular data type. In one embodiment described herein, the set of input strings 102 comprises a set of URLs utilized by a web search engine. In this embodiment, the set of input strings 102 is divided into buckets to allow minimal perfect hash values to be computed for large numbers of input strings. For instance, by dividing the set of input strings into buckets and allocating each of the buckets to its own server computer, minimal perfect hash values can be computed for billions of URLs. It should be appreciated that, although the use of buckets is described in the embodiments presented herein, the input strings need not be bucketed in order to utilize the concepts and technologies provided herein for generating a minimal perfect hash function. Additional details regarding the bucketing process utilized in one embodiment described herein are provided below with respect to FIG. 3.

From operation 202, the routine 200 continues to operation 204, where a variable utilized to identify a current bucket being processed is initialized to the first bucket in the group of buckets. The routine 200 then continues to operation 206, where the minimal perfect hash function internal table 110 is constructed for the current bucket. Details regarding the construction of the table 110 for a bucket are provided below with respect to FIG. 4.

Once the minimal perfect hash function internal table 110 has been created for the current bucket, the routine 200 continues to operation 208. At operation 208, a determination is made as to whether a table 110 must be created for additional buckets. If additional buckets exist for which a table 110 has not yet been created, the routine 200 branches from operation 208 to operation 210. At operation 210, the variable that identifies the current bucket is set equal to the next bucket for which a table 110 should be created. From operation 210, the routine 200 returns to operation 206, described above. If, at operation 208, the construction operation 106 determines that a table 110 has been created for each of the buckets, then the routine 200 continues from operation 208 to operation 212, where it ends.

It should be appreciated that following the completion of the processing operations illustrated with respect to FIG. 2, a table 110 will exist for each of the buckets. A table 110 corresponding to each bucket is utilized by the lookup operation 108 to generate a local minimal perfect hash value for the set of input strings allocated to that bucket. As will be described in greater detail herein, a global minimal perfect hash value may be generated for an input string across all of the buckets by first hashing the input string to determine the bucket it corresponds to. Once the bucket has been identified, the local minimal perfect hash value for the input string is identified for the appropriate bucket. Then, a global minimal perfect hash value valid across all of the buckets is generated by adding the number of minimal perfect hash values stored in all of the preceding buckets to the local minimal perfect hash value. In order to facilitate this process, each bucket may store data indicating the number of minimal perfect hash values located in each of the preceding buckets.

Figure 3:
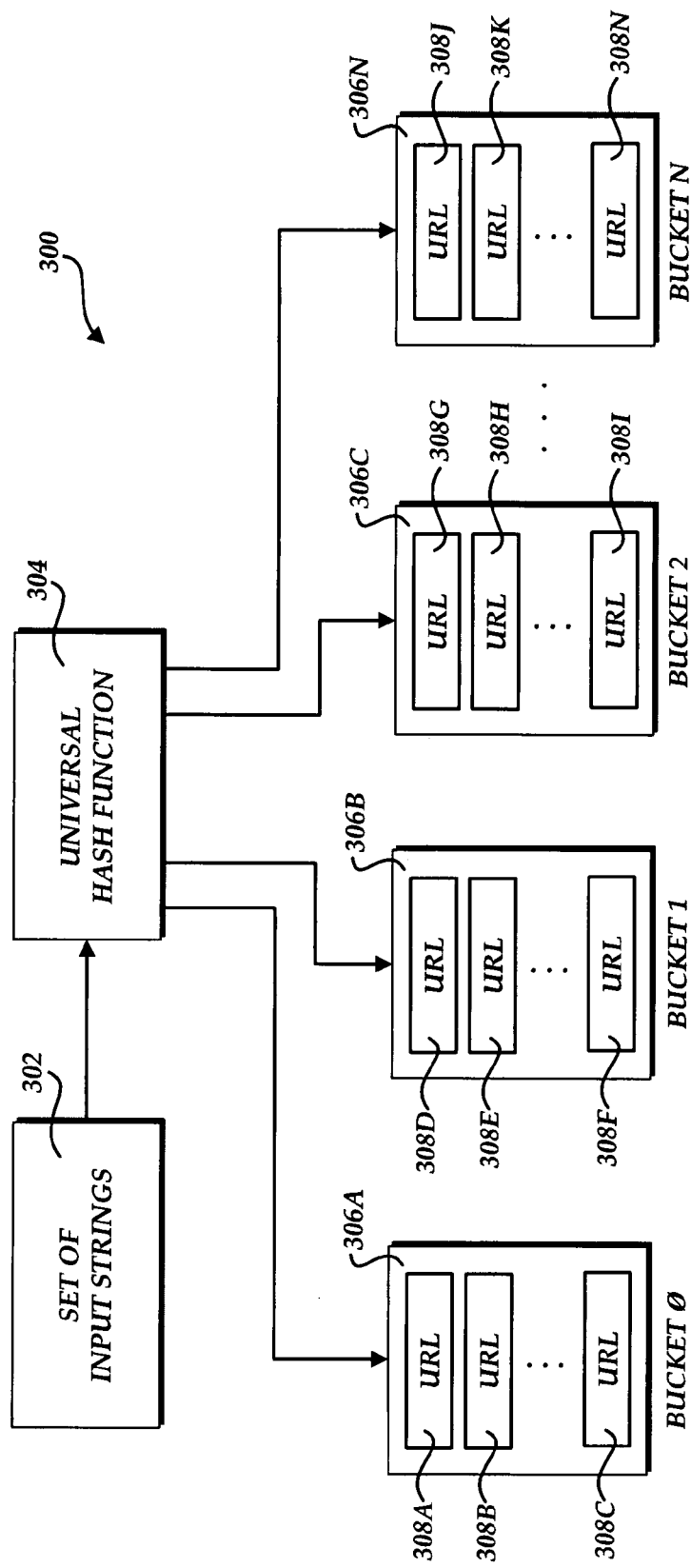
FIG. 3 is a software architecture and data structure diagram illustrating aspects of the bucketing process described with reference to FIG. 2 in one embodiment.

Referring now to FIG. 3, additional details will be provided regarding the process described above with respect to operation 202 of the routine 200 for allocating the set of input strings 102 to two or more buckets. In particular, FIG. 3, shows an illustrative software architecture 300 for bucketing the set of input strings 102. In the embodiment illustrated in FIG. 3, a universal hash function 304 takes the entire set of input strings 302 and maps the input strings to two or more buckets 306A-306N. The universal hash function 304 takes input strings of arbitrary length as input and randomly assigns the strings to integers from zero to N. The hash values output by the universal hash function 304 are then utilized to assign each of the input strings to one of the buckets 306A-306N.

As discussed briefly above, in one embodiment presented herein, the set of input strings 302 comprises a set of URLs. Accordingly, in the example illustrated in FIG. 3, the URLs 308A-308N have been assigned to the buckets 306A-306N. In particular, the URLs 308A-308C have been assigned to the bucket 306A, the URLs 308D-308F have been assigned to the bucket 306B, the URLs 308G-308I have been assigned the bucket 306C, and the URLs 308J-308N have been assigned to the bucket 306N. Each of the buckets 306A-306N may be stored at and processed by an individual server computer in one implementation described herein. It should be appreciated that although a universal hash function 304 has been illustrated in FIG. 3 as providing a mechanism for bucketing the set of input strings 302, other mechanisms may also be utilized.

Figure 4:
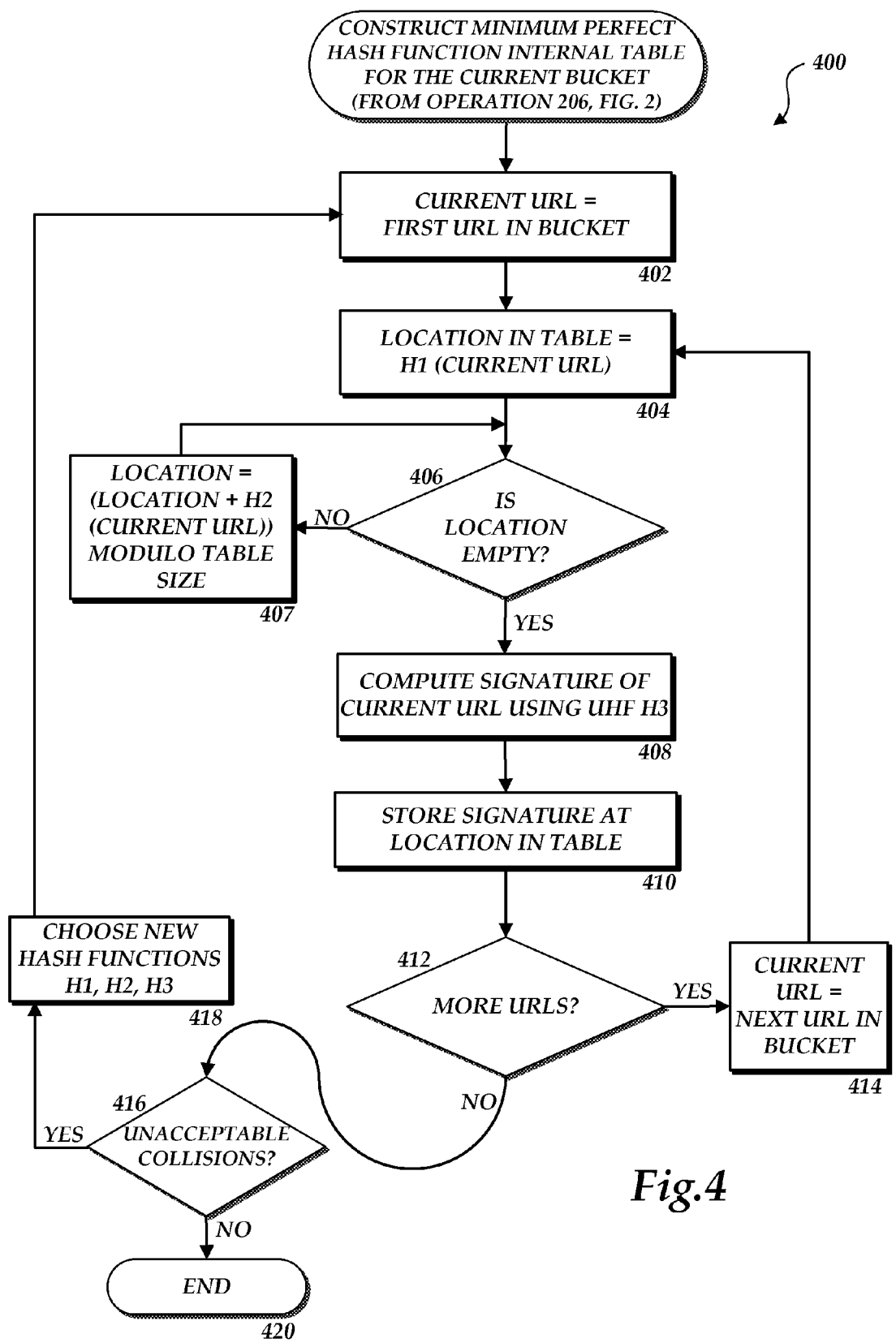
FIG. 4 is a flow diagram showing aspects of an illustrative process for constructing the internal state of a minimal perfect hash function provided in one embodiment described herein.

Referring now to FIG. 4, an illustrative routine 400 will be described that illustrates a process described briefly above with respect to FIG. 2 for constructing a minimal perfect hash function internal table 110 for a bucket of input strings. As discussed above with respect to FIG. 2, the routine shown in FIG. 4 is performed multiple times, once for each bucket of input strings. In this manner, one internal table 110 is created for each bucket that can be utilized by the lookup operation 108 to identify a local minimal perfect hash value for strings within a given bucket. It should be appreciated that each bucket of input strings preferably has no duplicate URLs. Duplicate URLs may cause the size of the table 110 to increase. It should be appreciated, however, the functionality presented herein will operate properly even in the presence of duplicate URLs.

The routine 400 begins at operation 402, where a variable identifying the current URL that is being processed is set equal to the first URL in the current bucket. From operation 402, the routine 400 continues to operation 404, where a location in the table 110 for the current bucket is identified by computing a hash value for the current URL utilizing a universal hash function, referred to herein as "H1." The universal hash function H1 is configured to take an input string and generate a hash value between one and the number of elements in the table 110. In one embodiment, the table 110 contains a prime number of elements that is greater than the number of input strings. Once a location in the hash table 110 has been identified by hashing the current URL using the hash function H1, the routine 400 continues to operation 406.

At operation 406, a determination is made as to whether the identified location in the table 110 is empty. As will be discussed in detail below, when an empty location is found within the table 110, a signature for the current URL is stored within the identified location. If no signature has previously been stored in the location, then the location will be empty. Accordingly, if the location is determined not to be empty at operation 406, the routine 400 proceeds from operation 406 to operation 407. At operation 407, a new location is identified in the table 110 utilizing the previously calculated location and an offset value into the table 110 generated by a second universal hash function, referred to herein as "H2." The universal hash function H2 also takes an input string and generates a hash value comprising an integer between one and the number of elements in the table 110. In order to identify the new location in the table 110, the universal hash function H2 is utilized to generate a hash value for the current URL. The generated hash value is then added to the previously identified location in the table 110 modulo the size of the table. Once this process has been performed, the routine 400 returns from operation 407 to operation 406, where another determination is made as to whether the identified location within the table 110 is empty. This process continues until an empty location is found in the table 110 for the current URL. Once an empty location in the table 110 has been identified, the routine 400 proceeds from operation 406 to operation 408.

At operation 408, a third universal hash function, referred to herein as "H3" is utilized to compute a signature for the current URL. In particular, the hash function H3 maps input strings to K-bit values, referred to herein as signatures. Once the hash function H3 has been utilized to compute a signature for the current URL, the routine 400 continues from operation 408 to operation 410. At operation 410, the computed signature is stored at the empty location located in the table 110. From operation 410, the routine 400 continues to operation 412, where a determination is made as to whether more URLs exist in the current bucket for which a signature should be generated and placed within the table 110. If additional URLs remain to be processed, the routine 400 branches from operation 412 to operation 414, where the variable utilized to store the current URL is updated to the value of the next URL in the current bucket. From operation 414, the routine 400 returns to operation 404, described above.

If, at operation 412, it is determined that no additional URLs remain in the current bucket to be processed, the routine 400 proceeds from operation 412 to operation 416. At operation 416, the construction operation 106 processes the table 110 to determine if any unacceptable collisions will be generated as a result of the configuration of the table 110. Unacceptable collisions will occur when the hash functions H1, H2, and H3 will generate identical signatures for two different URLs and also generate intersecting lookup paths within the table 110 for the URLs. If such a situation is encountered, the routine 400 proceeds to operation 418, where new hash functions H1, H2, and H3 are selected. From operation 418, the routine 400 returns to operation 402, where the process of populating the table 110 described above is repeated. If no unacceptable collisions are detected within the table 110, the routine 400 proceeds from operation 416 to operation 420, where it ends.

Figure 5:
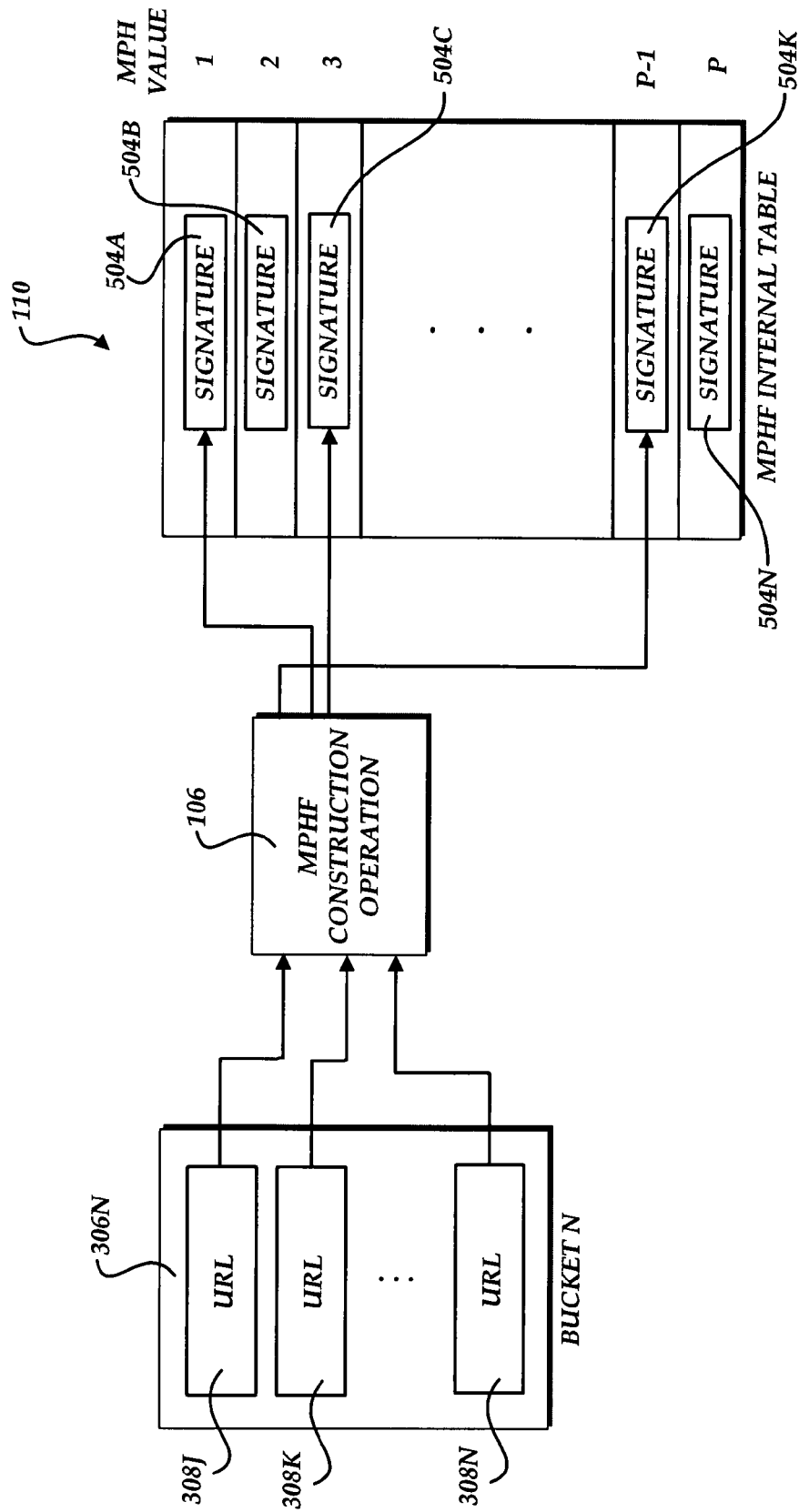
FIG. 5 is a software architecture and data structure diagram illustrating aspects of the construction process described with reference to FIG. 4 in one embodiment.

FIG. 5 illustrates the process of populating the table 110 with signatures corresponding to the input strings in greater detail. As shown in FIG. 1, the minimal perfect hash function construction operation 106 takes a bucket as input, such as the bucket 306N having URLs 308J-308N stored therein. The minimal perfect hash function construction operation 106 performs the processing operations described above with respect to FIG. 4 on each of the URLs 308J-308N. Through this process, locations are identified in the table 110 for each of the URLs 308J-308N. Additionally, signatures 504A-504N are computed for the URLs 308J-308N utilizing the hash function H3.

The computed signatures 504A-504N are then placed in appropriate locations within the hash table 110 by the construction operation 106. It should be appreciated that the minimal perfect hash value for each of the URLs 308J-308N corresponds to an integer identifying the location within the table 110 into which the corresponding signatures 504A-504N are placed. As will be described in greater detail below, the minimal perfect hash function lookup operation 108 provided herein searches the table 110 for a signature corresponding to an input string to identify the minimal perfect hash value for the input string. Additional details regarding this process are described below with respect to FIGS. 6 and 7.

Figure 6:
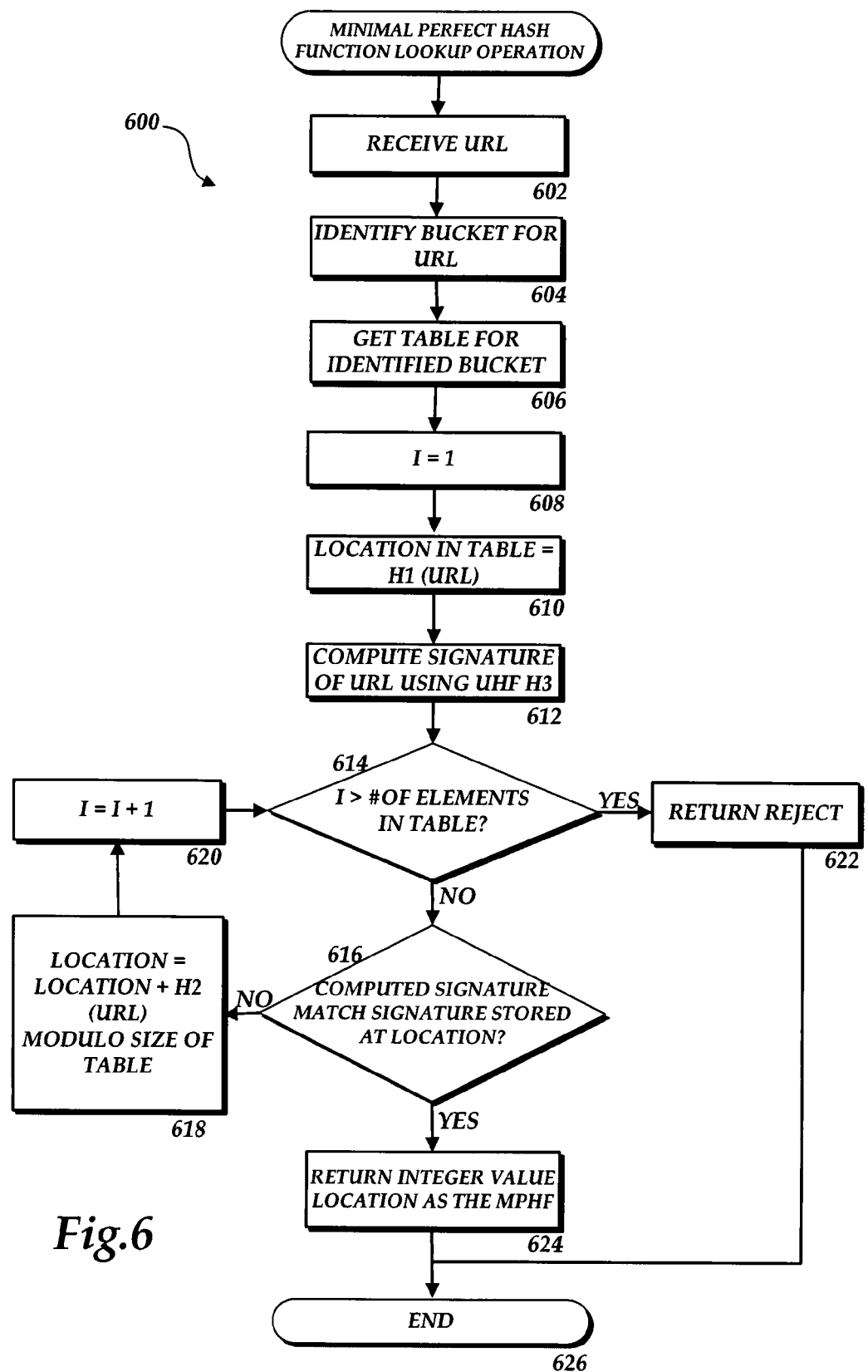
FIG. 6 is a flow diagram showing aspects of an illustrative process for performing a minimal perfect hash function lookup operation in one embodiment provided herein.

Referring now to FIGS. 6, additional details will be provided regarding the minimal perfect hash function lookup operation 108 provided herein. As discussed briefly above, the lookup operation 108 takes an input string 112 and utilizes the contents of the internal table 110 to generate its output. The output of the lookup operation 108 comprises an integer value 114 when the input string is located within the set of input strings 102. Alternatively, the output of the lookup operation 108 may comprise a rejection 116 when the input string 112 is not within the set of input strings 102. Details regarding this process are provided below.

The routine 600 begins at operation 602, where the URL comprising the input string is received by the lookup operation 108 at operation 602. From operation 602, the routine 600 continues to operation 604, where the bucket 306 for the received input string is identified. As discussed above, a hash function may be utilized to place the input strings 302 into the buckets 306A-306N. In a similar manner, the same hash function may be utilized to identify the bucket 306A-306N into which an input string has been placed. Once the appropriate bucket has been identified, the routine 600 continues to operation 606, where the table 110 for the identified bucket is obtained.

From operation 606, the routine 600 continues to operation 608, where a temporary variable utilized to represent the number of iterations that have been performed for the input string is initialized to the number one. This variable is referred to herein as "I." Once the variable has been initialized, the routine 600 continues to operation 610, where a location in the table 110 is identified by generating a hash value of the input string using the hash function H1. Once the location in the table 110 has been identified, the routine 600 continues to operation 612, where a signature for the input string is generated utilizing the universal hash function H3.

From operation 612, the routine 600 continues to operation 614, where the variable I is examined to determine if it is greater than the total number of elements in the table 110. If the variable is not greater than the number of elements in the table, the routine 600 continues to operation 616. At operation 616, the lookup operation 106 determines if the signature computed at operation 612 matches the signature stored in the current location of the table 110. If the computed signature does not match the current location within the table 110, the routine 600 proceeds from operation 616 to operation 618. At operation 618, a new location is identified within the table 110 by generating a hash value of the input string utilizing the hash function H2. The generated hash value is added to the current location in the table 110 modulo the size of the table. In this manner, a new location is identified within the table 110 at which to search for the computed signature. From operation 618, the routine 600 continues to operation 620, where the variable I is incremented. The routine 600 then returns to operation 614, described above. In this manner, locations in the table 110 are identified by double hashing the input string and searching the identified locations in the table for the computed signature of the input string. If the value of the variable I becomes greater than the total number of elements in the table, the routine 600 branches from operation 614 to operation 622, where the rejection 116 is returned. This indicates that the input string was not in the set of input strings 102 utilized by the construction operation 106 to generate the table 110.

If, at operation 616, a location within the table 110 is identified containing a signature that matches the computed signature of the input string, the routine 600 proceeds from operation 616 to operation 624. At operation 614, the lookup operation 108 returns an integer value identifying the location within the table 110 as the minimal perfect hash function. From operations 622 and 624, the routine 600 continues to operation 626, where it ends.

Figure 7:
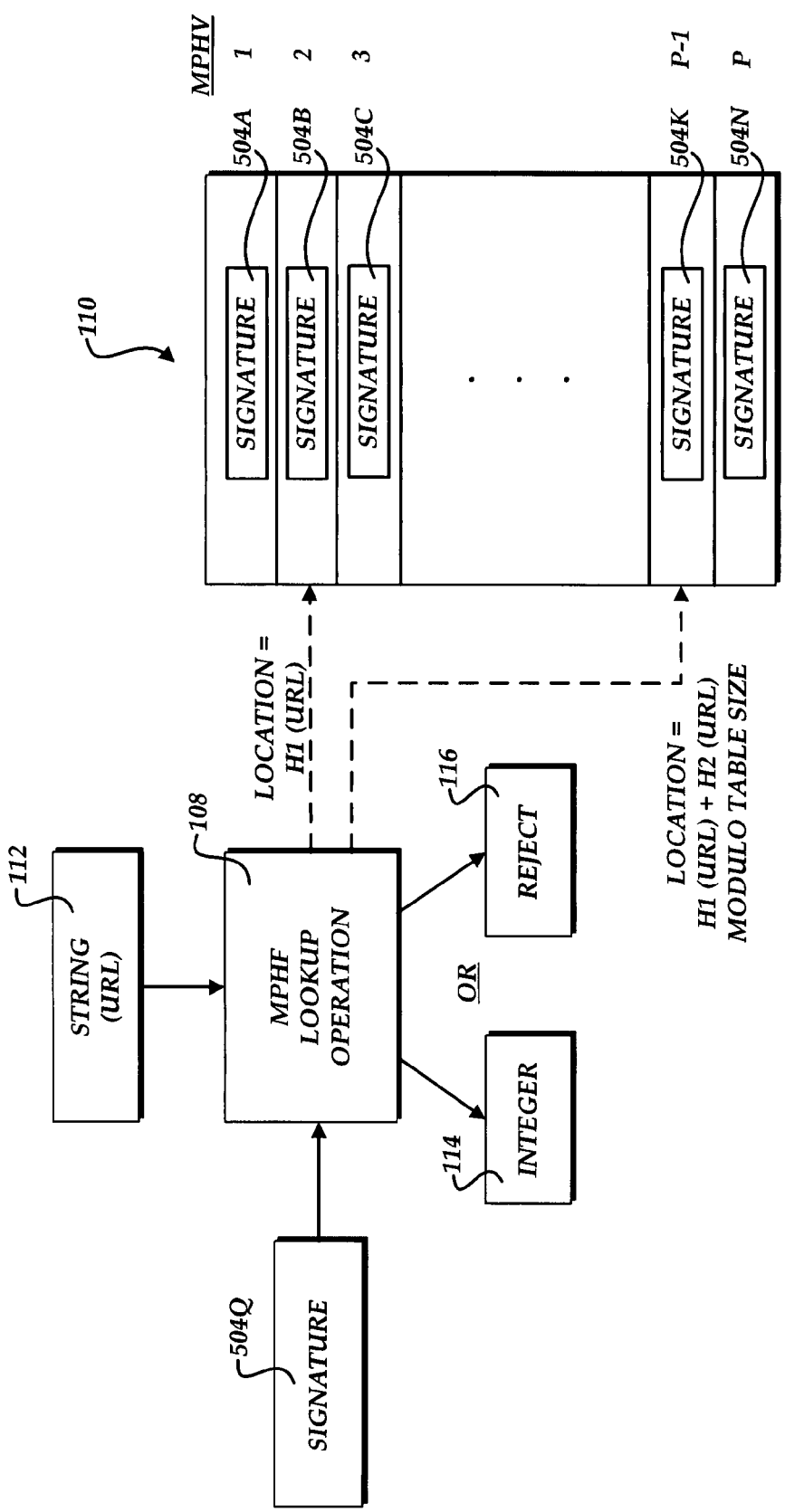
FIG. 7 is a software architecture and data structure diagram illustrating aspects of the lookup operation described with reference to FIG. 6 in one embodiment.

Referring now to FIG. 7, additional details regarding the lookup operation 108 described above with respect to FIG. 6 will be described. As shown in FIG. 7, the lookup operation 108 receives an input string 112 and computes a signature 504Q for the input string utilizing the hash function H3. The lookup operation 108 then computes a hash value for the input string 112 utilizing the hash function H1. This location within the table 110 is examined to determine if the location includes a signature corresponding to the input string 112. If so, the location of the identified signature within the table 110 is returned as an integer value 114 that represents the minimal perfect hash value for the input string 112.

If the location does not contain the signature 504Q for the input string 112, a new location is identified by generating a second hash value utilizing the hash function H2, and adding the generated hash value to the previous location modulo the size of the table. The new location is then examined to determine if the new location contains the signature 504Q corresponding to the input string 112. If not, this process is repeated until each of the elements within the table 110 have been examined or a matching location is found. If each of the locations within the table 110 are examined without locating a signature that matches the computed signature for the string 112, then the rejection 116 is returned as a result of the lookup operation 108. As discussed above, the rejection 116 is returned when the input string 112 is not a member of the set of input strings 102 utilized by the construction operation 106 in the creation of the internal table 110.

Figure 8:
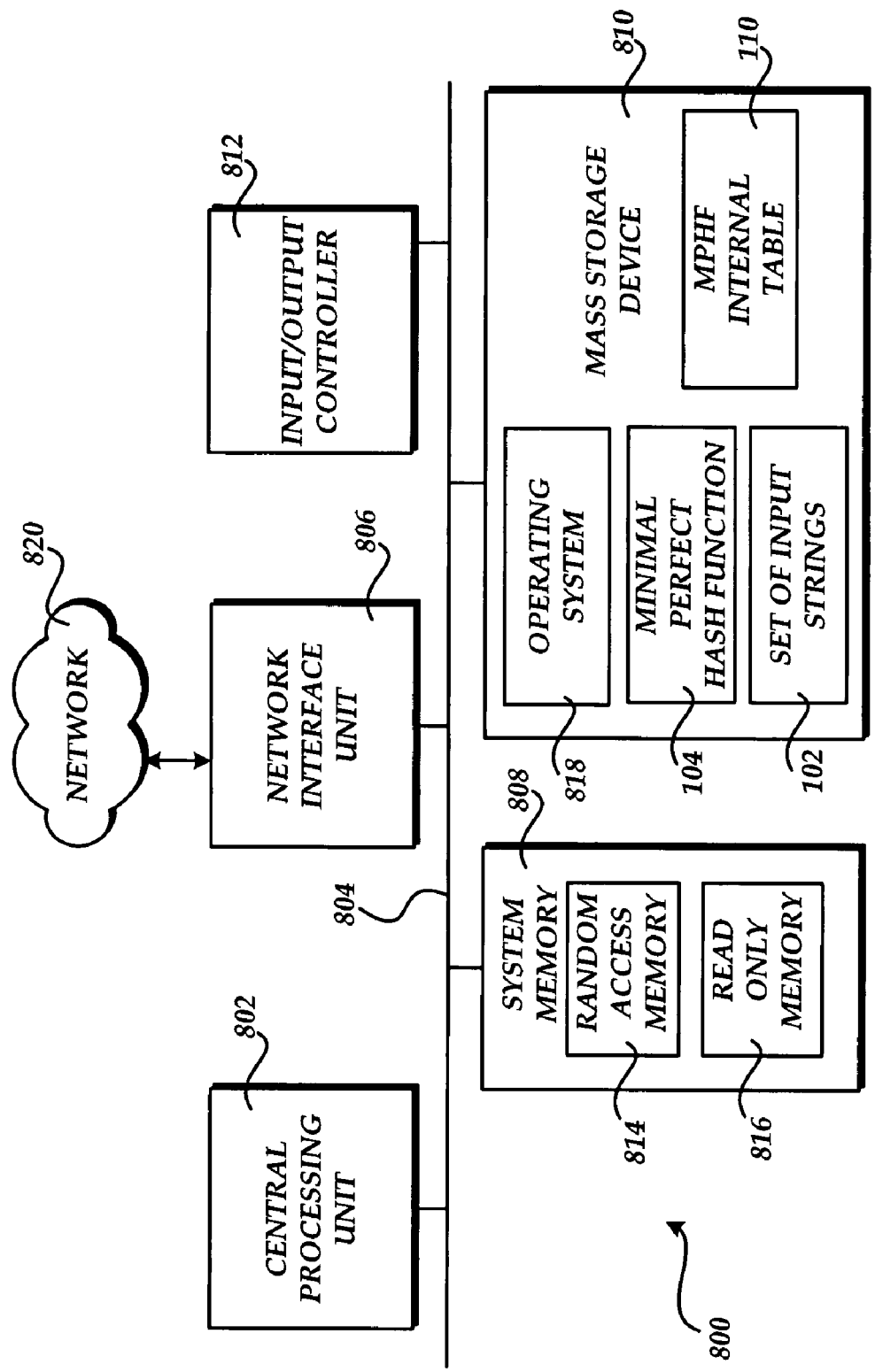
FIG. 8 is a computer architecture diagram showing an illustrative computer hardware and software architecture for a computing system capable of implementing the embodiments presented herein.

FIG. 8 shows an illustrative computer architecture for a computer 800 capable of executing the software components described herein for generating a minimal perfect hash function using double hashing. The computer architecture shown in FIG. 8 illustrates a conventional desktop, laptop, or server computer and may be utilized to execute the software components described herein.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which are described in greater detail herein.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules. In particular, the mass storage device 810 and the RAM 814 may store the minimal perfect hash function 104, the set of input strings 102, and the hash table 110, each of which have been described above. The mass storage device 810 and the RAM 814 may also store other program modules.

Based on the foregoing, it should be appreciated that technologies for providing a minimal perfect hash function using double hashing are disclosed herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments illustrated and described, and without departing from the spirit and scope of the present invention, which is set forth in the following claims.

What is claimed is:

1. A method for obtaining a minimal perfect hash value for an input string using double hashing, the method comprising:
constructing, utilizing a computer, a hash table by double hashing each string in a set of strings;
identifying, utilizing the computer, a location in the hash table for each string using a hash value computed by a first universal hash function ;
determining, utilizing the computer, if the location in the hash table for each string is empty;
in response to determining that the location in the hash table identified by the hash value for a string is not empty, combining, utilizing the computer, the hash value identifying the location in the hash table with a new hash value computed by a second universal hash function to identify a new location in the hash table for potentially storing a signature for the string;
in response to determining that the location in the hash table identified by the hash value is empty or in response to determining that the new location in the hash table identified by the new hash value is empty, computing, utilizing the computer, a signature for the string by a third universal hash function, and storing the signature for the string in the location or the new location of the hash table, respectively, based upon the determination;
following construction of the hash table, determining, utilizing the computer, whether the hash table contains intersecting lookup paths for different strings that have identical signatures;
in response to determining that the hash table contains intersecting lookup paths for different strings having identical signatures, selecting, utilizing the computer, a new first universal hash function, selecting a new second universal hash function, and constructing a new hash table by double hashing each string of the string in the set of strings using the new first universal hash function and the new second universal hash function; and
obtaining the minimal perfect hash value for the input string by iteratively double hashing the input string until a location is identified in the hash table that contains the signature corresponding to the input string, the minimal perfect hash value comprising an integer identifying the location in the hash table that contains the signature corresponding to the input string.

2. The method of claim 1, wherein each string of the set of strings comprises a uniform resource locator.

3. The method of claim 1, wherein obtaining the minimal perfect hash value for the input string further comprises determining whether each of the locations in the hash table have been examined without locating a signature corresponding to the input string and, in response thereto, rejecting the input string as not being within the set of strings.

4. The method of claim 1, further comprising:
bucketing the set of strings into two or more buckets; and
performing the constructing operation on the set of strings in each of the buckets.

5. The method of claim 1, wherein the hash table comprises a first variable number of locations, wherein the first variable number of locations is a prime number and is greater than a number of strings in the set of strings.

6. The method of claim 5, wherein a signature comprises a value having a second variable number of bits that is generated by the third universal hash function and corresponds to an input string.

7. A computer-readable medium that is not a signal having computer-executable instructions stored thereon which, when executed by a computer, cause the computer to:
implement a minimal perfect hashing function comprising a hash table constructed by double hashing each string in a set of strings using a first universal hash function and a second universal hash function to generate a hash value identifying an empty cell in the hash table for the string and storing a signature comprising a hashed value of the string generated from a third universal hash function in the empty cell of the hash table identified for the string;
following construction of the hash table, determining whether the hash table contains intersecting lookup paths for different strings that have identical signatures;
in response to determining that the hash table contains intersecting lookup paths for different strings having identical signatures, selecting a new first universal hash function, selecting a new second universal hash function, selecting a new third universal hash function, and constructing a new hash table using the new first universal hash function, the new second universal hash function, and the new third universal hash function;
obtain a minimal perfect hash value for an input string by iteratively double hashing the input string until a cell is identified in the hash table that contains a signature corresponding to the input string, the minimal perfect hash value comprising an integer identifying a location of the identified cell in the hash table;
determine whether each of the locations in the hash table have been examined without locating a signature corresponding to the input string; and
in response to determining that each of the locations in the hash table have been examined without locating a signature corresponding to the input string, rejecting the input string as not being within the set of strings.

8. The computer-readable medium of claim 7, wherein each string of the set of strings comprises a uniform resource locator, and wherein the uniform resource locators are organized in buckets.

9. A method for obtaining a minimal perfect hash value for an input string using double hashing, the method comprising:
computing, utilizing a computer, a signature for a string in a set of strings;
hashing, utilizing the computer, the string with a first universal hash function to obtain a first hash value;
identifying, utilizing the computer, a first location in a hash table for the string using the first hash value;
determining, utilizing the computer, if a signature was previously stored in the first location of the hash table;
storing, utilizing the computer, the computed signature in the first location of the hash table in response to determining that a signature was not previously stored in the first location of the hash table;
in response to determining that a signature was previously stored in the first location of the hash table, hashing, utilizing the computer, the string with a second universal hash function to obtain a second hash value, using the first hash value and the second hash value to identify a second location in the hash table, determining, utilizing the computer, whether a signature was previously stored in the second location in the hash table, and storing, utilizing the computer, the computed signature in the second location of the hash table in response to determining that a signature was not previously stored in the second location in the hash table;

determining, utilizing the computer, whether the hash table contains intersecting lookup paths for different strings that have identical signatures;

in response to determining that the hash table contains intersecting lookup paths for different strings having identical signatures, selecting, utilizing the computer, a new first universal hash function, selecting, utilizing the computer, a new second universal hash function, and constructing, utilizing the computer, a new hash table by double hashing each of the strings in the set of strings using the new first universal hash function and the new second universal hash function;

receiving, utilizing the computer, the input string;

computing, utilizing the computer, a signature for the input string;

hashing, utilizing the computer, the input string with the first universal hash function to obtain a first hash value for the input string;

identifying, utilizing the computer, a first location in the hash table for the input string using the first hash value for the input string;

determining, utilizing the computer, whether the first location in the hash table for the input string contains the computed signature for the input string; and returning, utilizing the computer, an integer value identifying the first location in the hash table for the input string as the minimal perfect hash value for the input string in response to determining that the first location in the hash table for the input string contains the computed signature for the input string.

10. The method of claim 9, wherein computing a signature for a string comprises computing a signature for the string using a third universal hash function for the string to the signature for the string comprising, the signature comprising a K-bit value.

11. The method of claim 10, further comprising in response to determining that the first location in the hash table for the input string does not contain the computed signature for the input string:

hashing the input string with the second universal hash function to obtain a second hash value for the input string;

identifying a second location in the hash table for the input string using the first hash value for the input string and the second hash value for the input string;

determining whether the computed signature for the input string is stored in the second location in the hash table for the input string; and returning an integer value identifying the second location in the hash table for the input string as the minimal perfect hash value for the input string in response to determining that the second location in the hash table for the input string contains the computed signature for the input string.

12. The method of claim 11, further comprising:

determining whether all of the locations in the hash table have been examined without identifying a location in the hash table containing the computed signature of the input string; and in response to determining that all of the locations in the hash table have been examined without identifying a location in the hash table containing the computed signature of the input string, rejecting the input string as not being within the set of strings.

13. The method of claim 12, further comprising bucketing the strings in the set of strings into two or more buckets.

14. The method of claim 13, wherein the strings comprise uniform resource locators.

15. The method of claim 14, wherein the hash table comprises a first variable number of locations, wherein the first variable is a prime number and is greater than the number of strings in the set of strings, and wherein a signature comprises a value having a second variable number of bits that is generated by the third universal hash function and corresponds to an input string.

* * * * *